US012632272B2

(12) United States Patent
    Fan et al.

(10) Patent No.: US 12,632,272 B2
(45) Date of Patent: May 19, 2026

(54) ADAPTIVE VIRTUAL DESKTOP SESSION PLACEMENT ON HOST SERVERS VIA USER LOGOFF PREDICTION

(71) Applicant: Omnissa, LLC, Mountain View, CA (US)

(72) Inventors: Wenping Fan, Beijing (CN); Yao Zhang, Beijing (CN); Qichen Hao, Beijing (CN); Xin Ya Wu, Beijing (CN); JiaWei You, Nanjing (CN)

(73) Assignee: Omnissa, LLC, Mountain View, CA (US)

( * ) Notice: Subject to any disclaimer, the term of this patent is extended or adjusted under 35 U.S.C. 154(b) by 816 days.

(21) Appl. No.: 17/392,297

(22) Filed: Aug. 3, 2021

(65) Prior Publication Data

US 2022/0398111 A1      Dec. 15, 2022

(30) Foreign Application Priority Data

Jun. 11, 2021     (WO) ................ PCT/CN2021/099679

(51) Int. Cl.
   *G06F 9/50*         (2006.01)
   *G06F 9/451*        (2018.01)
   *G06F 9/455*        (2018.01)
   *G06N 5/04*         (2023.01)

(52) U.S. Cl.
   CPC .......... *G06F 9/452* (2018.02); *G06F 9/45558* (2013.01); *G06N 5/04* (2013.01); *G06F 2009/45595* (2013.01)

(58) Field of Classification Search
   CPC ................. G06F 9/452; G06F 9/45558; G06F 2009/45595; G06F 2009/4557; G06N 5/04; G06N 5/01; G06N 20/20
   See application file for complete search history.

(56) References Cited

U.S. PATENT DOCUMENTS

| | | | | |
|---|---|---|---|---|
| 10,404,687 | B2 * | 9/2019 | Malkapuram | ......... H04L 67/141 |
| 2003/0037294 | A1 * | 2/2003 | Robsman | .................. G06F 9/52 |
| | | | | 714/55 |
| 2015/0032436 | A1 * | 1/2015 | van de Kamp | ......... G06F 9/455 |
| | | | | 703/13 |

(Continued)

OTHER PUBLICATIONS

Nursen Aydin, Ibrahim Muter, and S Ilker Birbil, Multi-objective temporal bin packing problem: An application in cloud computing, Computers & Operations Research, 121:104959, 2020.

(Continued)

*Primary Examiner* — Pierre Vital
*Assistant Examiner* — Abdou K Seye
(74) *Attorney, Agent, or Firm* — Kim & Stewart LLP

(57)         ABSTRACT

Systems and methods are provided for grouping remote desktop sessions on servers in remote desktop environments according to predicted user logoff times so that sessions with similar predicted logoff times can be placed together on the servers, allowing for more efficient utilization of servers. A user can request a virtual desktop session. Once the request is received, a predicted logoff time for the session can be determined and the session can be placed on one of available host servers based on the predicted logoff time. Different logoff time ranges can be assigned to different servers and sessions can be grouped on the servers according to predicted logoff time.

17 Claims, 6 Drawing Sheets

(56)         References Cited

U.S. PATENT DOCUMENTS

| | | | |
|---|---|---|---|
| 2016/0055017 A1* | 2/2016 | Beveridge | G06F 9/45558 |
| | | | 718/1 |
| 2016/0246787 A1* | 8/2016 | Zhang | G06F 16/172 |
| 2017/0126528 A1* | 5/2017 | Padmanabhan | H04L 43/20 |
| 2017/0185437 A1* | 6/2017 | Thomas | G06F 9/45558 |
| 2019/0213027 A1* | 7/2019 | Bhandari | G06F 9/505 |
| 2021/0103644 A1* | 4/2021 | Madishetti | H04W 12/61 |

OTHER PUBLICATIONS

Mauro Maria Baldi, Daniele Manerba, Guido Perboli, and Roberto Tadei, A Generalized Bin Packing Problem for parcel delivery in last-mile logistics, European Journal of Operational Research, 274(3):990-999, 2019.

Milan De Cauwer, Deepak Mehta, and Barry O'Sullivan, The Temporal Bin Packing Problem: An Application to Workload Management in Data Centres, 2016 IEEE 28th International Conference on Tools with Artificial Intelligence (ICTAI), pp. 157-164, IEEE, 2016.

Mauro Dell'Amico, Fabio Furini, and Manuel Iori, A Branch-and-Price Algorithm for the Temporal Bin Packing Problem, Computers & Operations Research, 114:104825, 2020.

Kristina Yancey Spencer, Pavel V Tsvetkov, and Joshua J Jarrell, A greedy memetic algorithm for a multiobjective dynamic bin packing problem for storing cooling objects, Journal of Heuristics, 25(1):1-45, 2019.

Eduardo C Xavier and Flávio Keidi Miyazawa, The class constrained bin packing problem with applications to video-on-demand, Theoretical Computer Science, 393(1-3):240-259, 2008.

Yao Zhang, Wen-Ping Fan, Xuan Wu, Hua Chen, Bin-Yang Li, and Min-Ling Zhang, Cafe: Adaptive VDI Workload Prediction with Multi-Grained Features, Proceedings of the Thirty-Third AAAI Conference on Artificial Intelligence, vol. 33, pp. 5821-5828, AAAI Press, 2019.

"Power Management on VMware Horizon Cloud on Microsoft Azure", https://techzone.vmware.com/resource/power-management-vmware-horizon-cloud-microsoft-azure##_Toc53070050, retrieved on Jul. 29, 2021.

"Remote Desktop Services Hosts", https://docs.vmware.com/en/VMware-Horizon-7/7.2/com.vmware.horizon.published.desktops.applications.doc/GUID-DFAD071A-7F60-4720-86AB-8F1597BFC95C.html, retrieved on Aug. 3, 2021.

* cited by examiner

| Category | Feature | Note |
|---|---|---|
| Fine-grained feature | (logontime_distance, session_total_duration) for session that logon at [±η] in last m days. | $m \in \{1, 2, 3, 4, 5, 6\}$. For multiple sessions in period, take the one that is nearest to $time\_of\_the\_day(ts^*_{a+1})$ |
| | (logontime_distance, session_remaining_duration) for session that existed at [±η] in last m days. | |
| Coarse-grained feature | average of session_remaining_duration of sessions existed in period [±η/3], [±2η/3], [±η] in last M days. | $M \in \{\{1, 2, 3\}, \{1, 2, \ldots, 7\},$ $\{1, 2, \ldots, 14\}, \{7, 8, \ldots, 14\}, \{15, 16, \ldots, 21\},$ $\{22, 23, \ldots, 28\}, \{7, 14\}, \{7, 14, 21, 28\}\}$ |
| | session_total_duration of sessions logon in period [±η/3], [±2η/3], [±η] in last M days. | |
| Context feature | current time | |
| | day of the week | |
| | current session index of today | |
| | pool average session duration of last 7 days | |

FIG. 4

ADAPTIVE VIRTUAL DESKTOP SESSION PLACEMENT ON HOST SERVERS VIA USER LOGOFF PREDICTION

CLAIM OF PRIORITY

This application is based upon and claims the benefit of priority from International Patent Application No. PCT/CN2021/099679, filed on Jun. 11, 2021, which is incorporated by reference herein in its entirety.

TECHNICAL FIELD

The present disclosure generally relates to remote desktop virtualization and more specifically to techniques for placing virtual desktop sessions on host servers in remote desktop virtualization.

BACKGROUND

Virtual desktops provided as part of remote desktop virtualization offerings such as remote desktop services (RDS), virtual desktop infrastructure (VDI), or desktop-as-a-service (DAAS) are becoming more commonplace in today's enterprise work environments. The security of having a remotely stored desktop, ability to access the desktop from any location and on any device, centralized desktop management, efficient use of hardware resources, as well as numerous other benefits made possible by remote desktop virtualization are a large benefit for many organizations.

In a conventional remote virtual desktop environment, each user in an enterprise is provisioned a virtual desktop and is allowed to access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote host server, which is linked to the local client device over a network using a remote display protocol, such as remote desktop protocol (RDP), PC-over-IP protocol (PCoIP), virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

Because power consumption is a significant ongoing cost in remote virtual desktop deployments, effective power management plays a key role for cost savings. A datacenter will typically contain numerous host servers, with each host server being capable of hosting multiple virtual desktop sessions. Generally, the host servers can be powered on and off as necessary based on user demand. To optimize power consumption, it is generally favorable to maintain the minimum number of powered-on servers possible. With traditional technology, as users log into their virtual desktops, the sessions are placed on the host servers in a round-robin or other predefined order, generally with the goal of placing numerous sessions on each server to optimize consumption of resources. However, once sessions are placed on a server, that server cannot be powered off until all the sessions have been terminated. For example, a host server cannot be powered-off even when there is only one session left on it. With traditional approaches, the situation often arises where relatively few sessions are spread across multiple servers, requiring many servers to remain powered-on for servicing relatively few sessions, which is inefficient.

What is needed is a more efficient way for managing session placement in remote desktop virtualization environments.

BRIEF DESCRIPTION OF THE DRAWINGS

FIG. 4 illustrates an example of descriptive features in logoff predictive modeling, in accordance with various embodiments.

DETAILED DESCRIPTION

Figure 1:
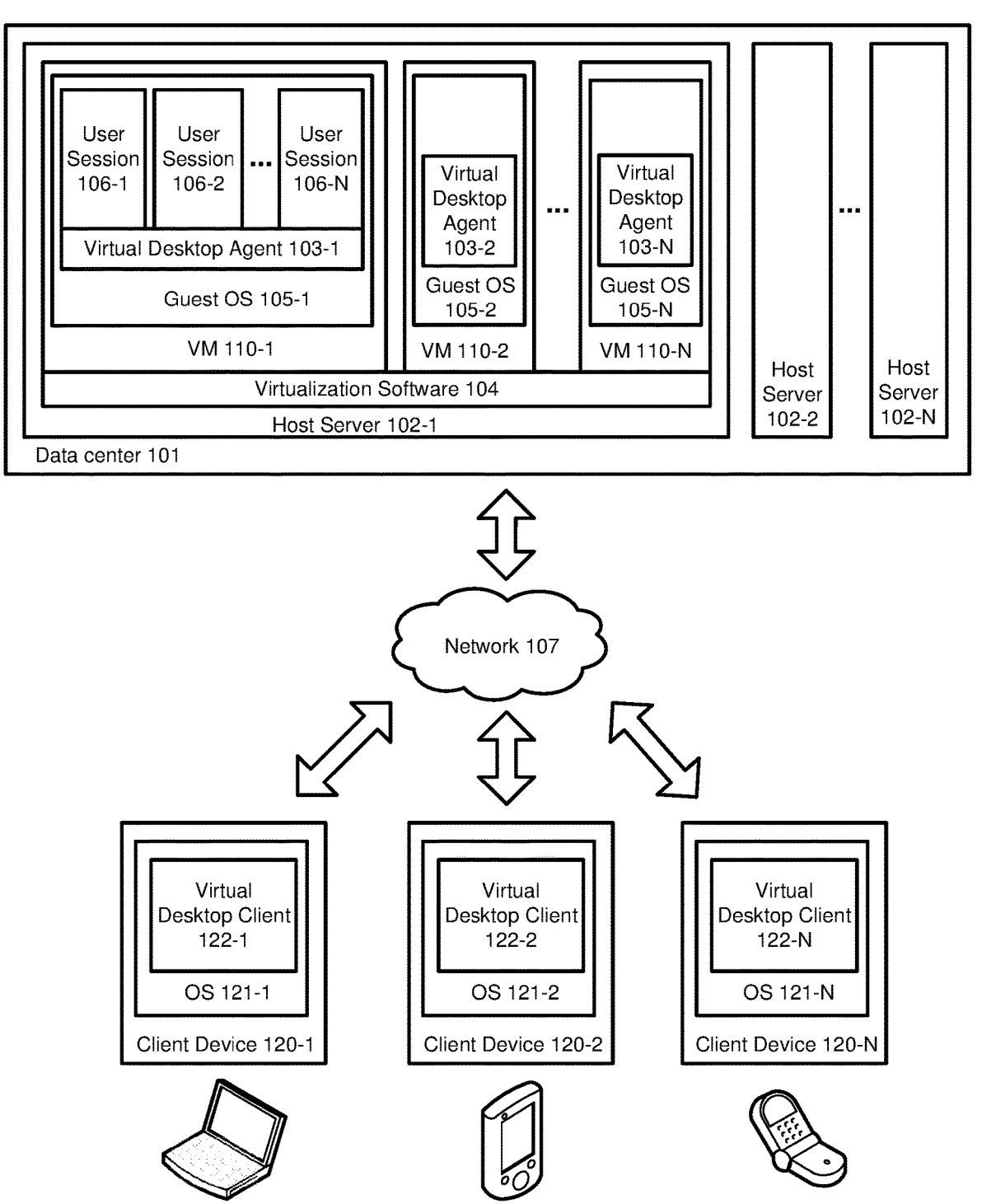
FIG. 1 illustrates an example of a remote desktop environment, in accordance with various embodiments.

Systems and methods in accordance with various embodiments of the present disclosure overcome at least some of the above-mentioned shortcomings and deficiencies by providing more efficient ways for managing session placement in remote desktop virtualization environments. In particular, embodiments described herein leverage a mechanism for grouping remote desktop sessions on servers according to predicted user logoff times so that sessions with similar predicted logoff times are placed together on the servers. As a result, all sessions running on a given server will be more likely to terminate closer in time, freeing up the server and allowing it to be powered off earlier. Consequently, the instances where relatively few remaining sessions occupy a server will be reduced, contributing to better overall server utilization and efficiency.

The process can begin with a user requesting to log into a virtual desktop in a remote desktop environment. Once the request is received, a predicted logoff time can be determined for the session based on, for example, historical session data of the user. Based on the predicted logoff time, the session can then be placed on one of available host servers. Different logoff time ranges can be assigned to different servers and sessions can be grouped on the servers according to predicted logoff time. The time ranges assigned to the servers can be determined based on historic session data from users in the user pool to produce efficient session distributions on the servers.

As used throughout this disclosure in the context of remote desktop environments, the terms, "desktop", "remote desktop", and "virtual desktop" are used interchangeably and refer to an instance of an operating system and/or application(s) that run(s) remotely with respect to the user. The terms "remote desktop environment" or "virtual desktop environment" are used interchangeably and refer to an infrastructure for providing remote desktops, such as RDS, VDI, and DAAS. In a conventional remote desktop environment, each virtual desktop corresponds to a computing environment provided by a virtual machine (VM) executed on a host server (i.e., a host computing device) that is physically located in a remote datacenter. Each host server may host any number of virtual machines (e.g., tens, hundreds, etc.) and each virtual machine may be owned by an individual user and in some types of deployments such as RDS the virtual machine may be shared among users. The virtual machine typically includes a guest operating system (e.g., Windows) capable of executing applications for the user or users and the virtual machine is used to provide a virtual desktop for the users or individual user, as the case may be. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

FIG. 1 illustrates an example of a remote desktop environment, in accordance with various embodiments. The virtual desktop environment includes host servers (102-1, 102-2, 102-N) that are communicatively coupled with a number of client devices (120-1, 120-2, 120-N) via a network 107. Network 107 may be a wide area network (WAN), or other form of remote communication link between the host servers (102-1, 102-2, 102-N) and client devices (120-1, 120-2, 120-N). Network 107 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise or in a data center of a third-party service provider.

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop session, such as one of user sessions 106-1, 106-2, 106-N, that is presented by a guest operating system 105-1 running on a virtual machine 110-1 on host server 102-1. Each desktop session 106-1, 106-2, 106-N running on the VM 110-1 can share the guest OS 105-1 and/or applications running in the guest OS 105-1 at the same time while using data unique to the user. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop and/or applications in the desktop. In this manner, the users of client devices (e.g., 120-1, 120-2, 120-N) can interact with the desktops hosted on host server 102-1 via respective user sessions (106-1, 106-2, 106-N) as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts multiple desktops for multiple users at a time. In various embodiment, the operating system (e.g., 105-1, 105-2, 105-N) can be a server operating system such as Windows Server, available from Microsoft Corporation. For example, if five users connect to host server 102-1 for the purpose of initiating remote desktop sessions, the host server 102-1 can launch the VM 110-1 and provide each user with a separate virtual desktop session on a separate virtual desktop. Likewise, as needed, other VMs (110-2, 110-N) can be launched on the host server 102-1 for hosting desktops for further users. Similarly, VMs (not pictured) can be launched on other host servers (102-2, 102-N) in the remote desktop environment to provide desktops to additional users. These types of virtual desktop environments where multiple desktops are hosted on each of several, server-side virtual machines are often referred to as remote desktop service (RDS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). For example, for each user session (e.g., 106-1, 106-2, 106-N), the interaction can be performed by the virtual desktop agent 103-1 transmitting encoded visual display information (e.g., framebuffer data) over the network to the virtual desktop client (e.g., 122-1, 122-2, 122-N) and the virtual desktop client (e.g., 122-1, 122-2, 122-N) in turn transmitting user input events (e.g., keyboard, mouse events) to the remote desktop agent 103-1, which directs the input events into the corresponding user session (e.g., 106-1, 106-2, 106-N). As illustrated, in this particular environment, each agent (e.g., 103-1, 103-2, 103-N) can be shared by numerous user sessions that are hosted on the VM (e.g., 110-1, 110-2, 110-N) where the agent runs.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. In some embodiments, VMs can run directly on host servers, in which case virtualization software may not be used. It will be apparent to one of ordinary skill in the art that the example shown in FIG. 1, as well as all other figures in this disclosure have been simplified for ease of understanding and are not intended to be exhaustive or limiting to the scope of the invention.

In various embodiments, different virtual desktop environments where multiple remote desktop sessions are placed on each server can likewise be implemented. For example, in some remote desktop environments, often referred to as virtual desktop infrastructure (VDI) and desktop as a service (DAAS), each host server in a datacenter can host multiple virtual machines via virtualization software in a similar way as illustrated in the example of FIG. 1, except a single virtual desktop can be provided by each VM. The host servers may physically reside in a data center of the enterprise (e.g., in case of VDI) or in a data center of a third-party service provider (e.g., in case of DAAS). In these types of virtual desktop environments, user desktops are hosted within separate, server-side virtual machines. The virtual desktop can be presented by a guest operating system running in the VM and an agent executing in the guest operating system can convey outputs from the desktop (e.g., GUI data) to a client running on a user device while user inputs are conveyed from the client to the agent in a similar fashion as described in the example of FIG. 1. Unlike the example of FIG. 1, however, in this type of environment the operating system and applications, as well as the virtual desktop agent, are not shared by multiple virtual desktops.

In various embodiments, virtual desktop environments can be configured to provide users with different scopes of functionality, such as to provide virtualized applications. In this case, users can be provided access to one or more applications running in a virtual desktop but not to other aspects of the computing environment, such as other applications and the operating system. A user can interact with the virtualized application using a client running on the user device that communicates with a server-side agent in a similar way as when a user interacts with an application in a virtual desktop as described above, except access can be limited, for example to only the virtualized application. It should be noted that, as the terms are used herein, a virtualized application is a type of remote desktop, as applicable. Similarly, a session on a virtualized application is a session on a remote desktop.

Figure 2:
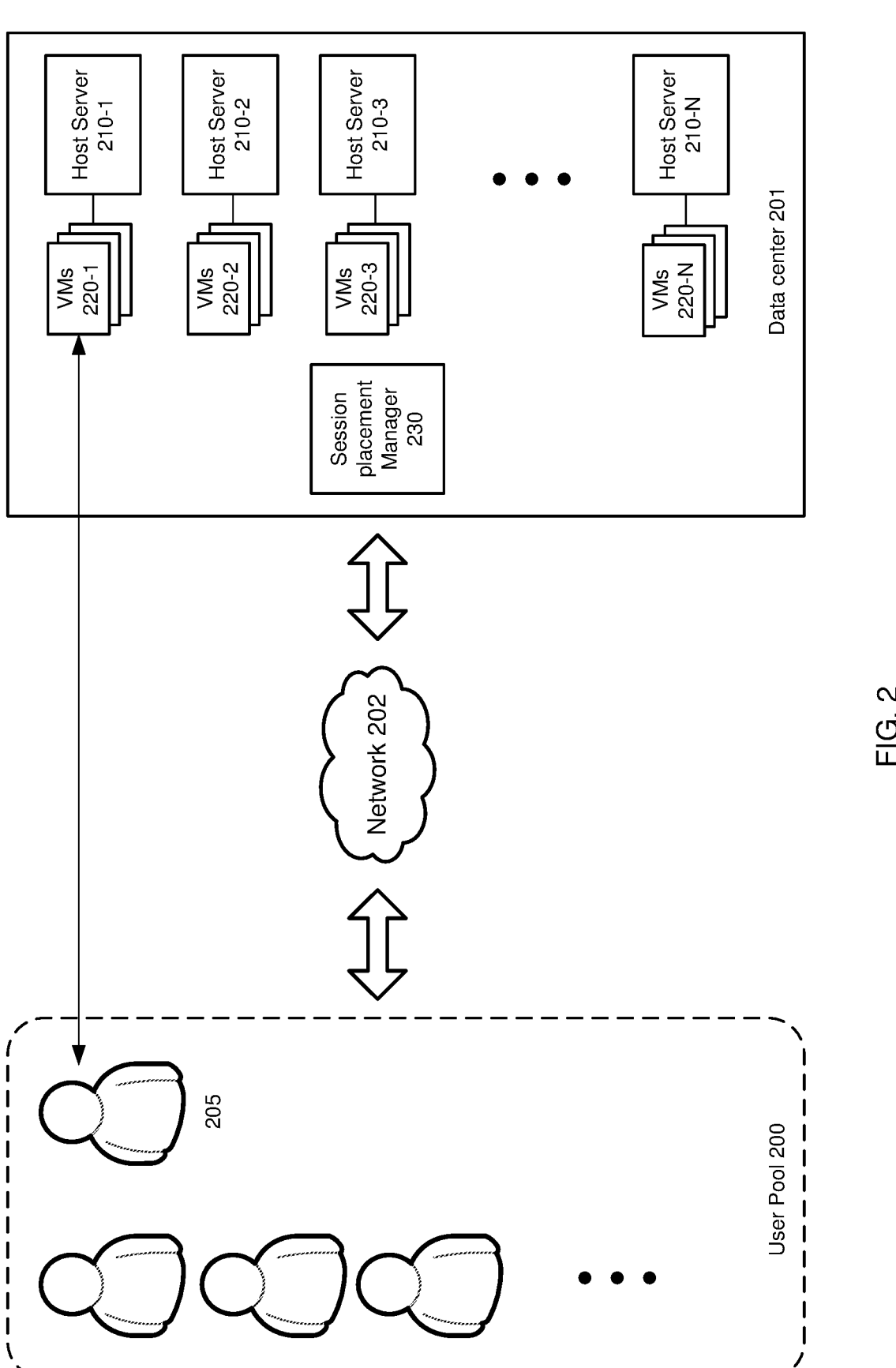
FIG. 2 illustrates an example system for adaptive virtual desktop session placement on host servers via user logoff prediction, in accordance with various embodiments.

FIG. 2 illustrates an example system for adaptive virtual desktop session placement on host servers via user logoff prediction, in accordance with various embodiments. The example of FIG. 2 illustrates a pool of users 200, each of whom can access virtual desktops (not pictured) hosted on host servers (210-1 through 210-N) in a remote desktop environment deployed in a datacenter 201 via a network 202. For example, the pool of users 200 can include any number of users (tens, hundreds, etc.) who may be employees in an enterprise and each user may be able to request and establish a virtual desktop session using a client device of the user (not pictured).

In various embodiments, the remote desktop environment can be an RDS, VDI, DAAS or another type of desktop virtualization environment providing remote desktops and/or virtualized applications to the user pool 200.

Each of the host servers (210-1 through 210-N) can host numerous (e.g., 10, 20, etc.) virtual desktops. For example, each host server (210-1 through 210-N) may be able to host virtual machines (220-1 through 220-N), and each virtual machine (220-1 through 220-N) can produce a virtual desktop (or multiple virtual desktops) into which a user or users can log in using a client device to establish virtual desktop sessions. The data center 201 further contains a session placement manager 230, which can be a software module executing in hardware in the data center 201 (e.g., on a management server or on a connection server, not pictured), which can be responsible for carrying out various operations described herein in connection with placement of sessions on the host servers (210-1 through 210-N), determining predicted session logoff times, determining time buckets and time ranges for servers, and managing the placement of sessions on the VMs (220-1 through 220-N), as will be described in further detail below. The session placement manager 230 can also record and store various information about the users 200 and about virtual desktop sessions that the users 200 have had in the past. As will be described in further detail below, the information about past user sessions can be used for operations such as predicting logoff times for requested sessions and for determining time ranges that are assigned to servers or to buckets placed on servers. The session data recorded and stored can include numerous information for each user and each session, such as logon/logoff times, days of week, session durations, calendar days, etc.). The remote desktop environment can contain various other components, such as connection brokers, management servers, firewalls, etc., which are not illustrated so as not to obscure salient features of the invention.

When a user requests a virtual desktop session, a virtual desktop can be provisioned for the user on any of the host servers (210-1 through 210-N). As mentioned, with previous technologies, sessions were placed on host servers in a round-robin fashion or according to other static rules, such as by filling the servers with sessions in order one by one. Generally, host servers can be turned off when they are not hosting any sessions and be turned on only when required, to conserve power. However, if even a single session remains on a server, the server cannot be powered off without terminating that session. Therefore, traditional approaches often face the problem of server under-utilization as relatively few remaining sessions can occupy and cause many servers to remain powered-on after other users have logged off of their respective session on the servers.

To address this issue, in various embodiments, sessions of users 200 can be grouped on the servers (210-1 through 210-N) according to predicted log-off times so that sessions with similar logoff times are placed on the same server. As a result, the likelihood of all sessions evacuating a server at a similar time increases, allowing the server (210-1 through 210-N) to be powered-off sooner. Thus, the system can better utilize servers (210-1 through 210-N) when they are powered-on and reduce instances where few sessions occupy servers (210-1 through 210-N) for extended periods of time.

In various embodiments, when a user 205 requests a virtual desktop session, the system can determine a predicted logoff time for the session. The predicted logoff time can be determined by the session placement manager 230, for example, using user session data that it has recorded and stored. Different algorithms, models, and methods can be used to derive the predicted logoff time for a user and the embodiments described in this disclosure are not limited to any particular method. For example, an algorithm can be used that predicts a logoff time for the session based on the time the session is requested by the user, historical session data of the user 205, and/or historical data of other users in the pool 200. Such historical data can include previous logon and logoff times of the user 205 or users 200, including information regarding the sessions such as the day of the week, session duration times, calendar days, etc. For example, the algorithm can predict the logoff time based on an average of previous logoff times. The averaged previous logoff times can also be taken from the same day of the week as the day when the session is requested.

The algorithm can also take into account the logon time of the session. For example, previous session data of the user 205 can be retrieved to find logoff times from when the user logged on at approximately the same time (e.g., within a predefined threshold proximity in time) as the currently requested session and those logoff times can be averaged to derive a prediction. The retrieved times can also be from the same day of the week. In various embodiments, the algorithm or model can utilize prediction algorithms that identify correlations and patterns between previous logoff times and myriad variables, such as previous logon times, days of the week, calendar days, quantity of other active sessions, etc.

Information other than historical user data can likewise be used to derive a logoff time prediction for the user 205. Such information may include information about the user from the user's profile (job position, location, etc.), information provided by an administrator, or information inputted by the user 205 (e.g., user may input an anticipated logoff time).

In an ideal embodiment, the prediction can be made using a machine learning algorithm that takes into account numerous features (or variables) that can be obtained from historical user 205 session data, such as previous logon times, logoff times, days of the week, etc. The algorithm can also take into account session data about other users in the pool 200. This approach will be described in further detail below.

After a logoff time for the user 205 is predicted, the system (e.g., via the session placement manager 230) can determine on which host server (210-1 through 210-N) to place the session. For example, the session placement manager 230 can determine that the session can be placed on the server 220-1. Then, as illustrated, the user 205 can be provided access to a virtual desktop running in a one of the VMs 220-1 on the server 210-1.

Various approaches and algorithms can be implemented to place sessions on the host servers (210-1 through 210-N) based on predicted logoff times of the sessions and the invention is not limited to any particular approach. In various embodiments, an algorithm or certain logic can be implemented by the session placement agent 230 to group sessions with similar predicted logoff times together on a server (210-1 through 210-N). For example, logoff times can be considered "similar" by the algorithm or logic when they fall within a predefined time range. The algorithm can place sessions whose predicted logoff times are within a predefined time range on the same server. For example, any of the servers (210-1 through 210-N) can be assigned a logoff time range (e.g., 4 pm to 6 pm) and sessions whose predicted logoff time falls within the logoff time range can be placed on that server, provided there is available capacity on it. Because a server's capacity is limited, the same time range can be assigned to multiple servers (e.g., when the number of sessions with predicted logoff time in the range is expected to exceed the capacity of one server) so that sessions with predicted logoff times in the range can be hosted on the multiple servers.

In various embodiments, numerous time ranges or "buckets" can be determined (e.g., by the session placement manager 230) for grouping sessions on servers. For example, a bucket can have a time range (e.g., 4 pm to 6 pm) and sessions with predicted logoff times in that range can be placed in that bucket. For example, a session with a predicted logoff time of 5:45 pm could be placed in the 4 pm to 6 pm bucket. Each bucket can have a server assigned to it and sessions that are placed in a bucket can be placed on the server assigned to that bucket. A bucket can be defined to hold a certain maximum number of sessions, the maximum number can be set by an administrator and can correspond to the maximum number of sessions that are permitted or desired on a server.

Several buckets can be created for the user pool 200. The buckets can span different time ranges and multiple buckets can cover the same time range. For example, multiple buckets may be created that cover the same time range in cases where the number of sessions with a predicted logoff time that will fall in the range is expected to exceed the capacity of one server. Once a bucket is full (i.e., no more sessions can be placed on the server), if another session is requested in the same predicted logoff time range, the system can check if another bucket is available for the same range. If one is not available, the session can be placed in the next closest bucket (i.e., the bucket with a time range that is the closest to the predicted session logoff out of all available buckets.

In various embodiments, a bucket can be defined for each host server (210-1 through 210-N) to best utilize the servers. That is, the number of defined buckets can equal the number of host servers.

It should be noted that a bucked does not necessarily have to be associated with any particular server. When no sessions are placed in a bucket, i.e., the bucket is empty, no server may be assigned to the bucket. Once a session is placed in the bucket, any available server can be powered-on and assigned to the bucket and subsequent sessions that are placed in the bucket can be likewise placed on the same server (until the server is full). When all sessions on the server are terminated, the bucket will be empty and the server can be powered off to conserve power. Subsequently, if another session is assigned to the bucket, another server or the same server can be assigned to the bucket. In different embodiments, a bucket can also have a designated server that is always assigned to it so that sessions placed in the bucket always run on that server.

Various approaches can be utilized for determining or defining the buckets for a pool of users 200. In various embodiments, the session placement manager 230 can determine the buckets based on historical user session data of the users in the pool 200 (e.g., statistics of session logon and logoff times in the user pool 200) using an algorithm or session placement bucket model. Such a model can be run periodically (e.g., daily, or twice per day) to update the buckets (e.g., to re-calculate the logoff time range assigned to each bucket). In other embodiments, the buckets can be defined by administrators or be determined using different algorithms, logic, and so on.

For example, the algorithm can analyze historical session data of the pool of users and determine the bucket time ranges based on this data. The algorithm can analyze session logoff data for a defined period, e.g., a day. The data can be taken from the same day of the week as the current day to eliminate weekday-dependent discrepancies, and the data can be averaged from several past days or periods. For example, the algorithm can analyze the obtained user session logoff times over the given period and determine bucket time ranges for the available servers that would have resulted in efficient placement of those sessions (e.g., to minimize overall server run time). The determined buckets can then be used for the current sessions. As will be appreciated by those skilled in the art, various approaches can be implemented for determining time ranges for buckets that will be assigned to available servers based on historical user session data such as historical user logoff patterns in the pool of users and the invention is not limited to any particular method of making these determinations. A preferred approach for determining bucket time ranges will be discussed in further detail below.

Figure 3:
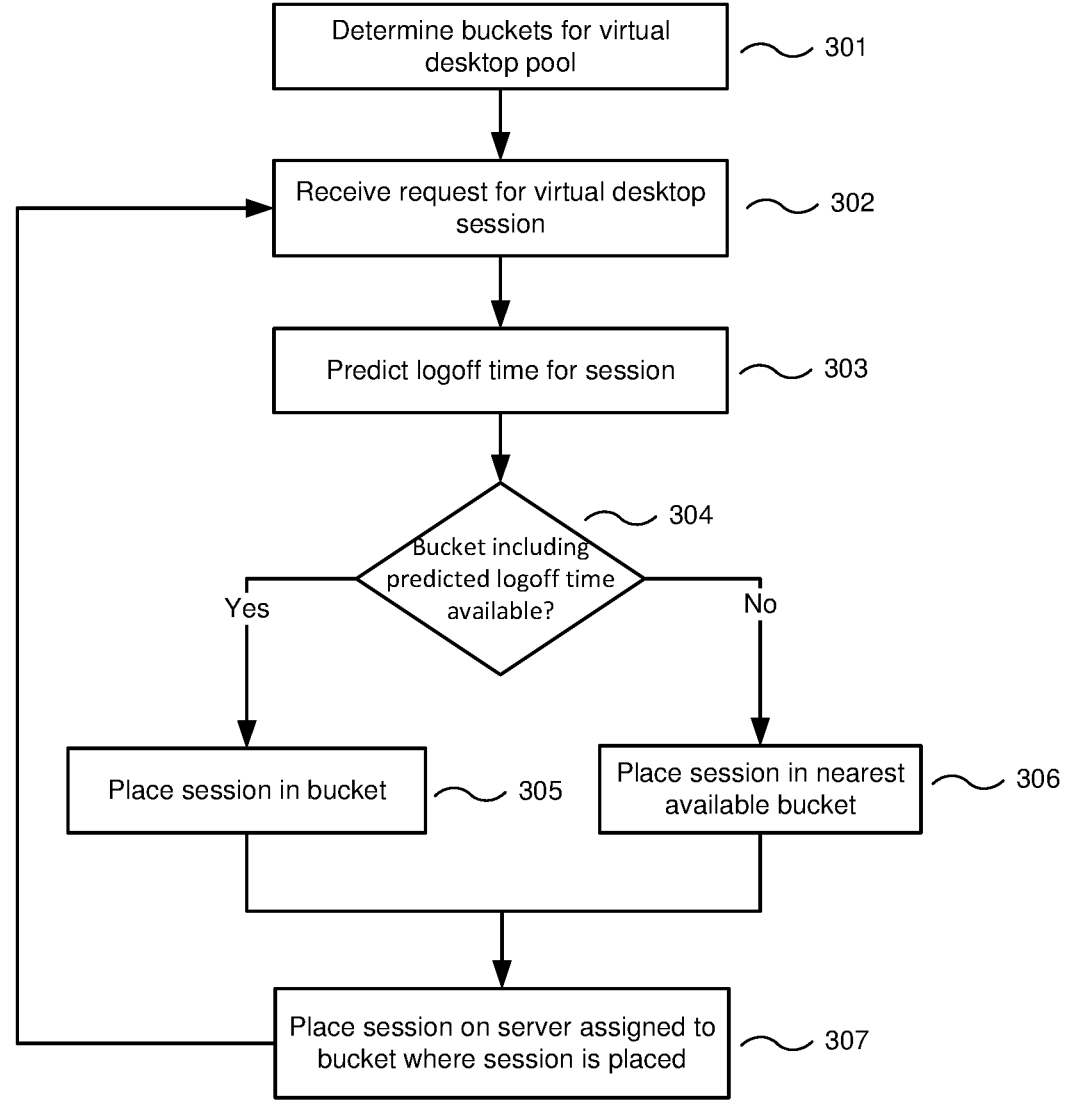
FIG. 3 illustrates an example process flow for adaptive virtual desktop session placement on host servers via user logoff prediction, in accordance with various embodiments.

FIG. 3 illustrates an example process flow for adaptive virtual desktop session placement on host servers via user logoff prediction, in accordance with various embodiments. The process can begin in operation 301, where buckets for the virtual desktop pool are determined. In various embodiments, the buckets can be determined automatically by the system using algorithms based on historical data of the user pool, such as logon time and logoff time statistics of the users in the user pool. The buckets can also be periodically updated. For example, the buckets can be updated daily or twice per day. In other embodiments, the buckets can be defined by administrators or be calculated in different ways using other algorithms.

In operation 302, a request for a virtual desktop session can be received from a user 302. In response to the request, in operation 303 a logoff time can be predicted for the user. As described above, the prediction can be derived in different ways, such as by using a machine learning algorithm or any other predictive algorithm that takes into account various historical data of the user and/or of the pool of users as well as other factors such as the current time.

After the predicted logoff time is generated, the process proceeds to decision 304 where it determines if a bucket containing the predicted logoff time is available. For example, the process can check whether the predicted logoff time falls within the logoff time range of any of the buckets determined in operation 301. If such a bucket is located and the bucket has space (i.e., it is not full), then the process can proceed to operation 305 and place the session in that bucket. If, on the other hand, a bucket containing the predicted logoff time does not exist, or if such a bucket or buckets do exist but are all full, then the process can proceed to operation 306, where the session is placed in the nearest available bucket. That is, in the bucket with a time range that is the closest to the predicted logoff time for the session, on which there is available space. The process can then proceed to operation 307 where the session is placed on the server assigned to the bucket where the session was placed. That is, if the session was placed in a bucket including the predicted logoff time, then the session can be placed on the server assigned to that bucket, and if the session was placed in a nearest available bucket, then the session can be placed on the server assigned to that bucket. The process can then return to operation 302 where another request for the virtual session is received and subsequent sessions can be similarly placed on the servers.

Logoff Prediction Modeling

As mentioned above, in various embodiments, machine learning approaches can be utilized for predicting user logoff times. Different machine learning techniques can be implemented, such as Gradient-Boosted Decision Trees (GBDT). For example, a model for the logoff time can be produced based on numerous input variables or features and the machine learning technique can be used for optimizing the predictive value of the model through successive iterations or steps in the learning process. Each step in the learning process (e.g., each iteration of the decision tree) can involve adjusting the model (e.g., adjusting the values of the coefficients, weights, or biases applied to each of the input variables or features being used to predict the target value (e.g., the logoff time)) with the aim of minimizing the difference between the predicted and actual target values.

Hence, in various embodiments a model can be developed for predicting a user's session logoff time based on various input variables or features. Machine learning techniques can then use historical session data of the user requesting the session as well as historical data of other users in the pool to optimize the model (e.g., adjust weights, biases, coefficients, etc.). The optimized model can then be used to predict the logoff time of the session being requested.

In various embodiments, feature generation for the predictive model can leverage the multi-grained description proposed in the paper "Cafe: Adaptive VDI Workload Prediction with Multi-Grained Features" by Yao Zhang, Wen-Ping Fan, Xuan Wu, Hua Chen, Bin-Yang Li, and Min-Ling Zhang in *Proceedings of the Thirty-Third AAAI Conference on Artificial Intelligence*, volume 33, pages 5821-5828. AAAI Press, 2019 (hereinafter referred to as "Zhang"), the disclosure of which is incorporated by reference herein in its entirety.

The formulation can be as follows: Given a user u's session history sequence $$s_n^u = (s_1^u, \ldots, s_n^u)$$

of length n, the sessions of all the users in the pool can be constructed as $$S_n = \{s_n^u \mid u \in U\}$$

where U is the universal set of pool users. Each session can be represented as $$s_l^u = \{ts_l^u, te_l^u\}$$

where ts is the session start time, to is the session end time. Letting $$s_{n+1}^u$$

be the user u next session, $h_n$ be the current session placement status on hosts, the aim is to learn the model f:

$$h_{n+1}^u = f(S_n, ts_{n+1}^u, h_n)$$

where $$h_{n+1}^u$$

is the host that $$s_{n+1}^u$$

should be placed on.

The model can be composed of session logoff prediction model $\omega$, session placement bucket model $\psi$, and placement strategy $\chi$:

$$f = \chi(te_{n+1}^u, b_t)$$

$$te_{n+1}^u = \omega(s_n^u, ts_{n+1}^u)$$

$$b_t = \psi(S_n, h_n)$$

Here, $$te_{n+1}^u$$

is the session logoff time we aim to learn in the logoff prediction model, $b_t$ is the bucket allocation retrieved from the session placement bucket model, t is the time in minutes.

For the session logoff prediction model, the feature generation $$c_n = g(s_n^u, ts_{n+1}^u)$$

can follow the multi grained description proposed in Zhang. Let $$S = \{s_1^u, s_2^u, \ldots, s_T^u \mid u \in U\}$$

be the full-length session sequence of one VDI pool, which in turn leads to the data dataset $$D = \{(c_n, te_{n+1}^u) \mid 1 \le n \le N, \ u \in U\}.$$

Here, Nis the total number of the sample in sequence, $c_n$ is the resulting multi-grained feature vector, the regressor r: $c_n \to \mathbf{R}$ can be derived by invoking some regression learning method L on D. i.e. g←L(D).

In the session placement bucket model, the bucket can be updated whenever there is a session count valley to peak climb, let $t_k$ be the update time, the $b_i$ satisfies $b_i = b_{i+1} \ldots = b_j (i<j)$ where $i>t_k$ and $j \le t_{k+1}$. Here, $b_t$ is derived from a model that considers both statistics of historical sessions and existing sessions on host: $b_t = \psi(s_n, h_n)$, the data structure of $b_t$ is as follows:

```
{
  "START_TIME" : "2020-10-19 04:00:00Z",
  "END_TIME" : "2020-10-19 05:00:00Z",
  "HOST_COUNT" : 2,
  "HOSTS" : [host_id1, host_id2],
  "HOST_CAPACITY" : 56,
}
```

With predicted session $s_{n+1}$'s logoff time $$te_{n+1}^u$$

which derived from the logoff prediction model $\omega$, the session placement is performed according to the distance of $$te_{n+1}^u$$

and START_TIME/END of the bucket.

The feature $c_n$ can be composed of components from different categories including seasonal and contextual features, the seasonal features describes user logoff behavior in coarse-to-fine granularity.

FIG. 4 illustrates an example of descriptive features in logoff predictive modeling, in accordance with various embodiments. In the table, given a session logon time $$ts_{n+1}^u,$$

[±y] means the time period $$[time\_of\_the\_day(ts_{n+1}^u) - \gamma, \ time\_of\_the\_day(ts_{n+1}^u) + \gamma).$$

Here y is set according to the average standard of deviation of user logoff time in the pool:

$$\gamma = mean_{user}[std_{session}(hour\_of\_the\_day(te_t^u))]$$

Given a session logon time $$ts_{n+1}^u,$$

predicting its logoff time is the same as predicting how long the session will remain before logoff, namely session duration. The seasonal feature is based on the fact that session duration of one user is similar with the user's sessions that logged on and existed at approximately the same time historically. For example, if a user logs on at 9:00 AM, the user's historical sessions that logged on at 9:20 AM and logged on earlier at 7:30 AM but were still online at 9:00 AM could give a reference of how long the session will remain. In particular, the fine-grained feature detailed describes sessions over the last m days and focuses on daily and weekly patterns and reflects the session duration trend, if any. Whereas the coarse-grained feature is the aggregation of sessions over the last several days, which gives a global observation of the session duration. The context feature depicts contextual information such as time, current session index of the day, and pool average session duration. The current session index of the day refers to how many sessions have logged on before this user during the day.

Session Placement Bucket Modeling

As mentioned, in various embodiments a session placement bucket model can be utilized to allocate hosts with logoff time range buckets based on historical session statistics, such as historical session logon and logoff times in the user pool. The model can be used to determine the plurality of buckets that the host servers will be assigned to.

In this approach, historical session data of users in the user pool (e.g., days or weeks of historical user session data) can be analyzed to produce a model of user logoff behavior in the user pool. For example, the model can predict or estimate when sessions will log off during a certain period or "modelled period" for which the model is being produced, such as a day, a 24-hour period, etc. The model can take data from a previous day (e.g., from a previous day that was the same day of the week) or from several previous days (e.g., using an average) to produce a session logoff distribution for the modelled period. Such a session logoff distribution can, for example, identify or predict how many sessions are expected to be logon on throughout the modelled period and the corresponding logoff times of the sessions. For example, the session logoff distribution can divide the period into defined intervals (e.g., 10 or 15 minutes) and estimate or predict how many sessions are expected to log off during each predefined time interval.

Once the model determines a predicted or estimated distribution of session logoff times throughout the modelled period, the model can determine a plurality of buckets (e.g., determine buckets and logoff time ranges for the buckets) based on the logoff time distribution. An algorithm can be used by the model to determine optimized buckets based on the session logoff time distribution and based on the maximum number of allowed sessions per bucket (which can be the maximum number of allowed sessions on each server, as may be set by an administrator). Namely, the model can determine optimized buckets (e.g., determine optimal logoff time ranges of sessions placed in the buckets) into which the predicted or estimated sessions can be placed in the model based on the predicted session logoff time (e.g., based on the logoff time distribution) and based on the maximum number of permitted sessions in each bucket. Hence, the model can use algorithms (e.g., learning algorithms) to determine optimized buckets for placing the estimated or predicted sessions based on the predicted session logoff time such that improvements are achieved, such as improvements in bucket utilization (or corresponding server utilization) and/or reduction in overall bucket use-time (corresponding to reduced overall server run time).

For example, the algorithm may determine what allocation of buckets (e.g., what logoff time allocation to the buckets) results in reduced or minimized total cumulative time that buckets are used throughout the period. In this sense, a bucket is being "used" when any sessions are placed in it. Accordingly, the cumulative time that buckets are used refers to a sum of the total time that all buckets are used during the period.

When a bucket is being used, a server assigned to the bucket is powered-on for hosting sessions in the bucket. Accordingly, by minimizing the amount of cumulative time that buckets are used, the combined amount of server run-time for all the host servers can likewise be minimized or reduced. Hence, in various embodiments, the algorithm can be designed to minimize or reduce cumulative server run time and to improve server utilization; that is, to increase or maximize the number of sessions hosted on each server when it is running while decreasing the total cumulative run-time of the servers together.

Figure 5A:
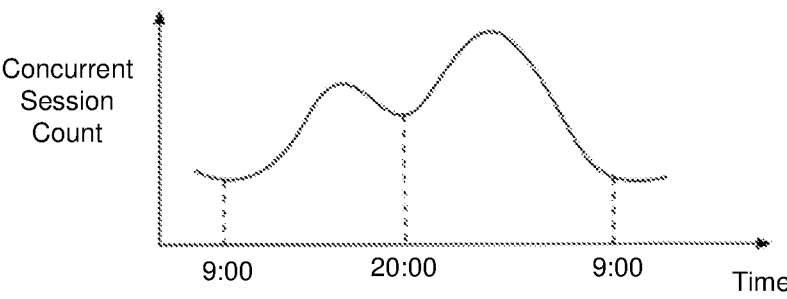
FIG. 5A illustrates an example graph of concurrent session count over time, in accordance with various embodiments.
Figure 5B:
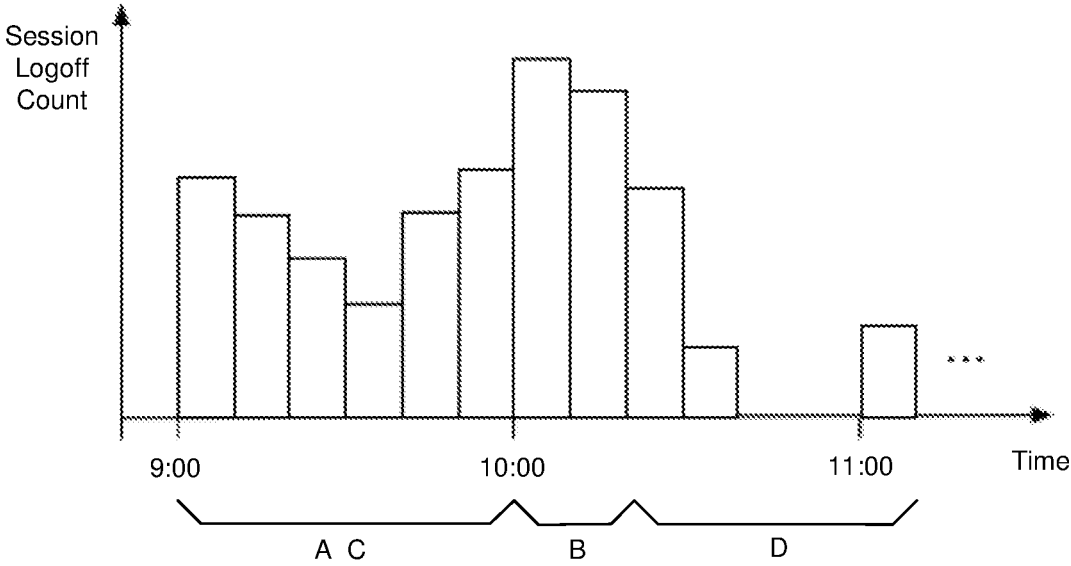
FIG. 5B illustrates an example bar graph of session logoffs over time, in accordance with various embodiments.
Figure 5C:
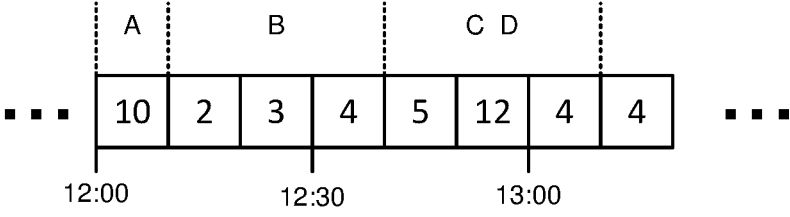
FIG. 5C illustrates an example of the process of bucket allocation based on logoff distribution data, in accordance with various embodiments.

FIGS. 5A to 5C illustrate steps of an example bucket model. First, historical concurrent session count of the user pool can be analyzed to determine the valleys and peaks in the fluctuation of concurrent sessions. For example, historical logon and logoff data of the users can be retrieved and analyzed to determine the number of concurrent sessions in the pool over a defined period, such as a day. The data for several days (e.g., four weeks) can be analyzed and averaged to produce such data.

FIG. 5A illustrates an example graph of concurrent session count over time, in accordance with various embodiments. On the Y-axis, the graph shows the number of total concurrent sessions in the pool at any given time. Time is on the X-axis. Based on the data, a time range of each valley to peak fluctuation can be obtained. In various embodiments, the low point from where the session count begins climbing can be where the bucket model will be updated. For example, in FIG. 5A, the fluctuation period is from 9:00 to 20:00, which can be the modelled period, and 9:00 is the low point. In various embodiments, the bucket model update can be performed with sessions that are logged on in the fluctuation period.

Next, the sessions that were logged on in the identified range or modelled period (e.g., 9:00 to 20:00 as in this example) can be aggregated by session logoff time during fixed time intervals (e.g., 10 minutes) and the data can be plotted in a bar graph to obtain a session logoff distribution throughout the modelled period.

FIG. 5B illustrates an example bar graph of session logoffs over time, in accordance with various embodiments. In this graph, the Y-axis represents the number of session logoffs during corresponding time intervals and the X-axis represents time. Hence, each bar represents a 10-minute interval, and the height of the bar represents the number of sessions that logged off in that 10-minute interval. In this example, the chosen time interval is 10 minutes, but the interval can be different in other cases. For example, the height of the first bar represents the number of sessions that logged off between 9:00 and 9:10.

In various embodiments, this distribution can be used to generate the buckets for host servers. For example, as illustrated in FIG. 5B, buckets A and C can be assigned to the time range [9:00-10:00), bucket B can be assigned to time range [10:00-10:20), and bucket C can be assigned to time range [10:20-11:10). The bucket model can be built with the assumption that the sessions remaining from the last fluctuation will log off soon. Thus, the servers that host these sessions (A and C in FIG. 5B) can be allocated with bucket time in the near future. Then, the other unoccupied host can be allocated with remaining time buckets.

In various embodiments, the allocation of time ranges to buckets can be based on the capacity of the host, which can be predefined (e.g., by an administrator).

FIG. 5C illustrates an example of the process of bucket allocation based on logoff distribution data, in accordance with various embodiments. In this example, the numbers in the boxes represent the number of sessions that log off in the corresponding time slot. Here, each time slot is again 10 minutes. For example, in the first time slot of 12:00 to 12:10, 10 sessions log off. In various embodiments, the buckets can be determined for the successive time slots with the aim of grouping the time slots into buckets so that the session logoff count sums up to integer multiples of host capacity, so that the host is maximum utilized. For example, the time slots can be grouped one by one in order (e.g., starting from one end of the data) and the terminal condition of grouping can be that the total session logoff count is farther from integer multiples of host capacity than before.

In the example of FIG. 5C, the host capacity can be 10 sessions. Then, as indicated by the dotted lines, the buckets can be determined by grouping time slots so that the session logoff count sums up to integer multiples of host capacity. As illustrated, the time slot 12:00 to 12:10, in which 10 sessions log off, can be assigned to a time bucket A. The time slot 12:10 to 12:40, in which 9 sessions log off, can be assigned to a time bucket A. The time slot 12:40 to 13:10, in which 21 sessions log off, can be assigned to time buckets C and D. And so on, the process can continue for the entire time range or modelled period in which the buckets are being determined (e.g., for the fluctuation period of valley to valley).

Figure 6:
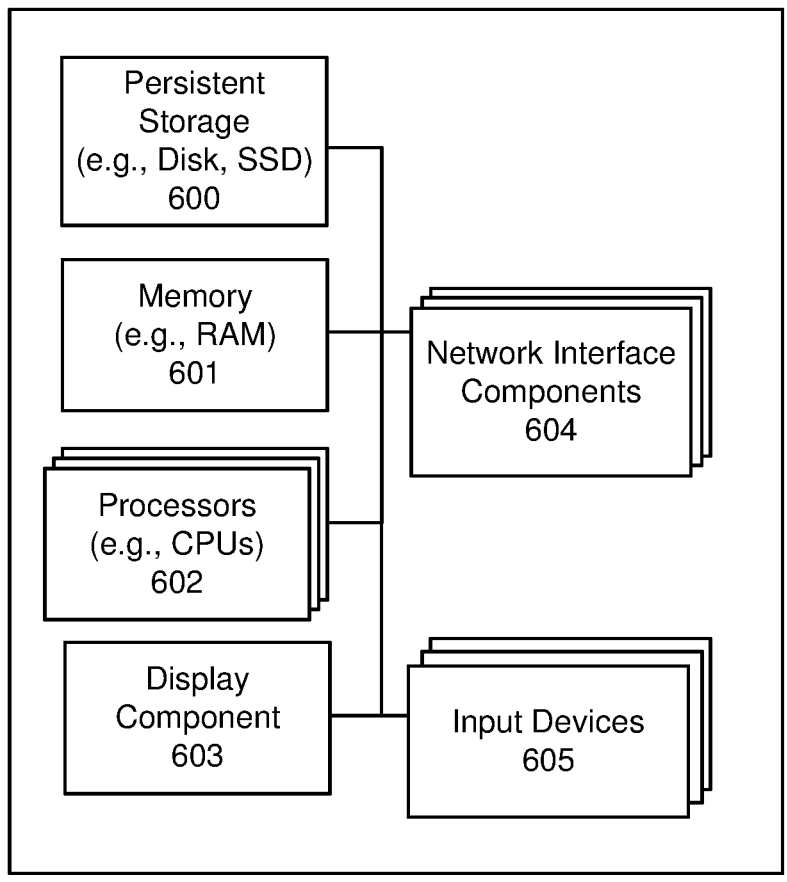
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of initiating a session on a client device in a remote desktop environment, the method, comprising:
   receiving, at a session placement manager over a network, a request from the client device to initiate the session for a user, the session placement manager having historical user session data for the user;
   determining, by the session placement manager, one or more buckets by defining a corresponding range of session logoff times for each of the one or more buckets;
   assigning the one or more buckets among the plurality of host servers;
   executing, by the session placement manager in cooperation with a virtual desktop agent in a host server of a plurality of host servers in the remote desktop environment, the session on the host server, the host server having a virtual desktop with which to execute the session, the virtual desktop executing another session, the session having a predicted logoff time, based on a logon time of the session and the historical user session data, which is within a range of another predicted logoff time of the other session, the host server of the plurality of host servers being assigned the range of a plurality of ranges;
   identifying a bucket of the one or more buckets with a corresponding time range that includes the predicted logoff time of the session;
   selecting, by the session placement manager, the server of the plurality of servers assigned to the bucket as identified; and
   transmitting, by the virtual desktop agent to a virtual desktop client executing on the client device, encoded virtual display information to display the session of the virtual desktop.

2. The method of claim 1, wherein a logoff time range is assigned to the determined host server and the session placement manager places sessions with predicted logoff times that fall within the assigned logoff time range onto the determined host server.

3. The method of claim 1, wherein the session placement manager predicts the logoff time for the session based on the time that the session is requested and based on historical data about session durations of previous virtual desktop sessions of the user.

4. The method of claim 1, wherein the session placement manager determines the one or more buckets based on data about previous session logoff times of a plurality of users.

5. The method of claim 1, wherein the session placement manager determines the one or more buckets based on a session placement bucket model, the session placement bucket model comprising the steps of:

determining, based on historical data about previous sessions of a plurality of users, predicted sessions that log off during a predefined modelled period and corresponding predicted logoff times of the predicted sessions; and determining one or more optimized buckets for placing the predicted sessions during the modelled period based on the predicted session logoff times and based on a maximum number of permitted sessions in each optimized bucket, wherein determining the one or more optimized buckets comprises determining a corresponding range of session logoff times for each of the one or more optimized buckets.

6. The method of claim 1, wherein the session placement manager is configured to determine the host server based on a session logoff prediction model, a session placement bucket model, and a placement strategy.

7. A computing device configured to initiate a session on a client device in a remote desktop environment, comprising:
   at least one processor; and
   memory including instructions that, when executed by the at least one processor, cause the computing device to perform the steps of:
      receiving, at a session placement manager, a request from the client device to initiate the session for a user, the session placement manager having historical user session data for the user;
      determining, by the session placement manager, one or more buckets by defining a corresponding range of session logoff times for each of the one or more buckets;
      assigning the one or more buckets among the plurality of host servers;
      executing, by the session placement manager in cooperation with a virtual desktop agent in a host server of a plurality of host servers in the remote desktop environment, the session on the host server, the host server having a virtual desktop with which to execute the session, the virtual desktop executing another session, the session having a predicted logoff time, based on a logon time of the session and the historical user session data, which is within a range of another predicted logoff time of the other session, the host server of the plurality of host servers being assigned the range of a plurality of ranges;
      identifying a bucket of the one or more buckets with a corresponding time range that includes the predicted logoff time of the session;
      selecting, by the session placement manager, the server of the plurality of servers assigned to the bucket as identified; and
      transmitting, by the virtual desktop agent to a virtual desktop client executing on the client device, encoded virtual display information to display the session of the virtual desktop.

8. The computing device of claim 7, wherein a logoff time range is assigned to the determined host server and the session placement manager places sessions with predicted logoff times that fall within the assigned logoff time range onto the determined host server.

9. The computing device of claim 7, wherein the session placement manager predicts the logoff time for the session based on the time that the session is requested and based on historical data about session durations of previous virtual desktop sessions of the user.

10. The computing device of claim 7, wherein the session placement manager determines the one or more buckets based on data about previous session logoff times of a plurality of users.

11. The computing device of claim 7, wherein the session placement manager determines the one or more buckets based on a session placement bucket model, the session placement bucket model comprising the steps of:

determining, based on historical data about previous sessions of a plurality of users, predicted sessions that log off during a predefined modelled period and corresponding predicted logoff times of the predicted sessions; and determining one or more optimized buckets for placing the predicted sessions during the modelled period based on the predicted session logoff times and based on a maximum number of permitted sessions in each optimized bucket, wherein determining the one or more optimized buckets comprises determining a corresponding range of session logoff times for each of the one or more optimized buckets.

12. The computing device of claim 7, wherein the session placement manager is configured to determine the host server based on a session logoff prediction model, a session placement bucket model, and a placement strategy.

13. A non-transitory computer readable storage medium for initiating a session on a client device in a remote desktop environment, comprising one or more sequences of instructions, the instructions when executed by one or more processors causing the one or more processors to execute the operations of:

receiving, at a session placement manager, a request from the client device to initiate the session for a user, the session placement manager having historical user session data for the user;

determining, by the session placement manager, one or more buckets by defining a corresponding range of session logoff times for each of the one or more buckets;

assigning the one or more buckets among the plurality of host servers;

executing, by the session placement manager in cooperation with a virtual desktop agent in a host server of a plurality of host servers in the remote desktop environment, the session on the host server, the host server having a virtual desktop with which to execute the session, the virtual desktop executing another session, the session having a predicted logoff time, based on a logon time of the session and the historical user session data, which is within a range of another predicted logoff time of the other session, the host server of the plurality of host servers being assigned the range of a plurality of ranges; and identifying a bucket of the one or more buckets with a corresponding time range that includes the predicted logoff time of the session;

selecting, by the session placement manager, the server of the plurality of servers assigned to the bucket as identified; and transmitting, by the virtual desktop agent to a virtual desktop client executing on the client device, encoded virtual display information to display the session of the virtual desktop.

14. The non-transitory computer readable storage medium of claim 13, wherein a logoff time range is assigned to the determined host server and the session placement manager places sessions with predicted logoff times that fall within the assigned logoff time range onto the determined host server.

15. The non-transitory computer readable storage medium of claim 13, wherein the session placement manager predicts the logoff time for the session based on the time that the session is requested and based on historical data about session durations of previous virtual desktop sessions of the user.

16. The non-transitory computer readable storage medium of claim 13, wherein the session placement manager determines the one or more buckets based on data about previous session logoff times of a plurality of users.

17. The non-transitory computer readable storage medium of claim 13, wherein the session placement manager determines the one or more buckets based on a session placement bucket model, the session placement bucket model comprising the steps of:

determining, based on historical data about previous sessions of a plurality of users, predicted sessions that log off during a predefined modelled period and corresponding predicted logoff times of the predicted sessions; and determining one or more optimized buckets for placing the predicted sessions during the modelled period based on the predicted session logoff times and based on a maximum number of permitted sessions in each optimized bucket, wherein determining the one or more optimized buckets comprises determining a corresponding range of session logoff times for each of the one or more optimized buckets.

* * * * *